April 9, 1929.  D. C. DAVIS  1,708,262
HARDNESS TESTING DEVICE
Filed Feb. 25, 1927
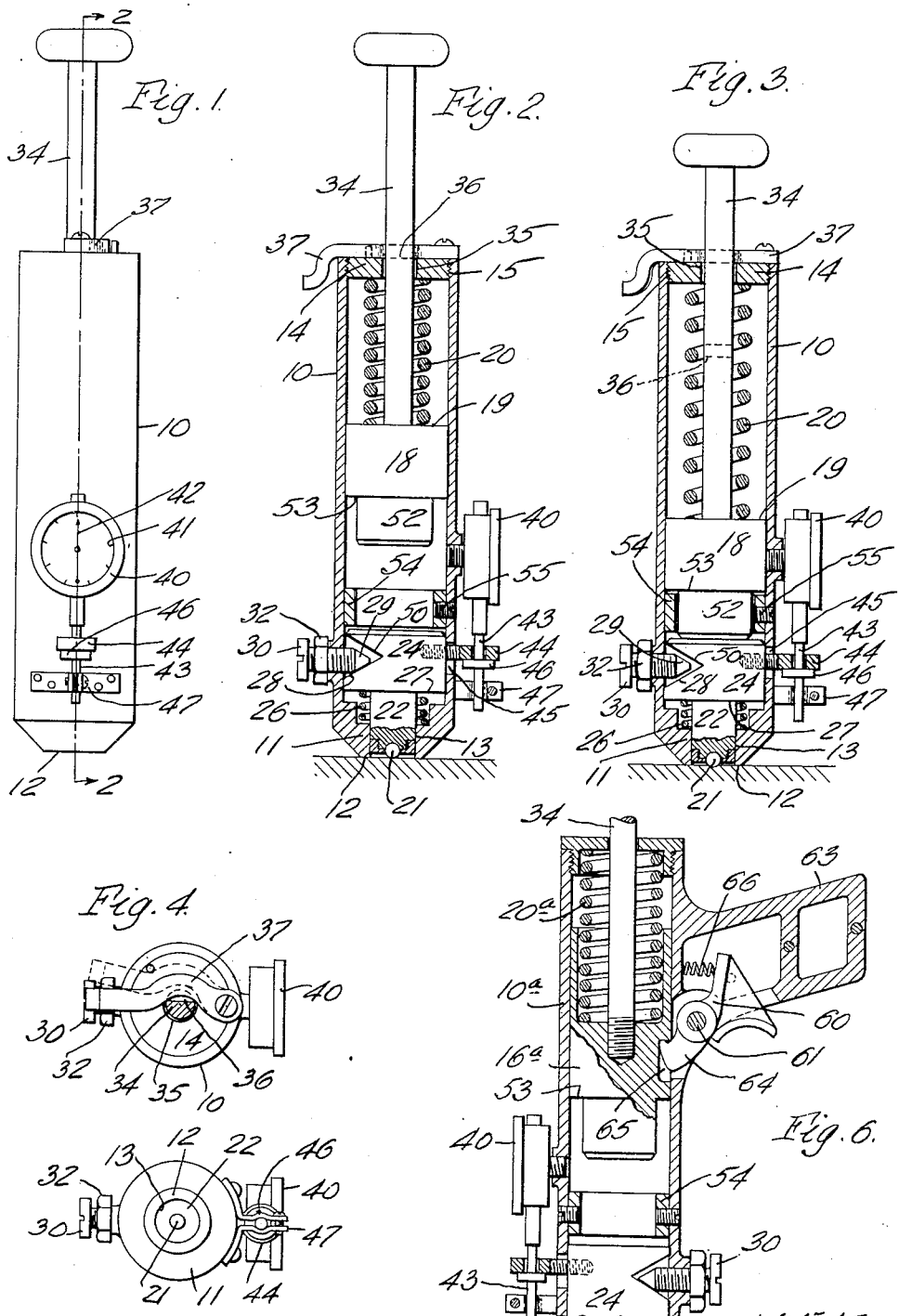
INVENTOR.
Donald C. Davis
by Parker & Prochnow
ATTORNEYS.

Patented Apr. 9, 1929.

1,708,262

UNITED STATES PATENT OFFICE.

DONALD C. DAVIS, OF WILLIAMSVILLE, NEW YORK; LOU BRADSHAW EXECUTOR OF SAID DONALD C. DAVIS, DECEASED.

HARDNESS-TESTING DEVICE.

Application filed February 25, 1927. Serial No. 170,789.

This invention relates to improvements in devices for testing the hardness of materials by the Brinell method, in which the hardness of the material is determined from the measurement of an indentation made therein by the impact of a hardened steel ball or other test member driven against the surface of the sample.

The invention particularly refers to portable or hand-operated devices or tools of that type having a casing in which is arranged a plunger movable in one direction to compress a driving spring or element, and means for holding the parts in this condition, and which can be actuated to release the plunger. The plunger then moves in the opposite direction under the influence of said spring to drive the test ball into the sample.

The principal objects of the invention are to provide a compact and inexpensive, portable device or hand tool of this character having relatively few, simple parts, and which will not readily get out of order; and also to provide a device of this kind in which the parts can be easily and quickly removed and replaced at small cost.

Other objects are to provide an improved hardness testing device of the sort described having a plunger, a striking block or anvil carrying a test ball or member, and a compressible member adapted, when released, to cause an impact of said plunger against said block to drive the test member into the sample; also to provide an adjustable member engageable with said block for placing the same and the test member carried thereby into predetermined initial or inoperative relation to the casing of the device or to the sample; also to provide means for holding said block yieldingly in said inoperative position against said adjusting member; also to provide stop means for preventing injury to said plunger, said block and said adjusting member in the event that the device is used under abnormal conditions; also to provide means for actuating a dial or scale device through the movement of said block for indicating the depth of penetration of said test member into a sample; and also to improve and simplify the construction of devices of the kind stated in the other respects hereinafter set forth and claimed.

In the accompanying drawings:

Fig. 1 is a side elevation of one form of portable, hand-operated hardness testing device embodying the invention.

Fig. 2 is a sectional elevation thereof on line 2—2, Fig. 1, showing the parts in position for making a test.

Fig. 3 is a similar view of the device at the moment of making a test.

Fig. 4 is a top plan view thereof with the stem of the plunger in section.

Fig. 5 is a bottom plan view thereof.

Fig. 6 is a fragmentary, sectional elevation of a hardness testing device of modified construction, with the parts positioned for making a test.

The portable hardness testing device or tool shown in Figs. 1–5 includes a cylindrical casing 10 having a transverse lower, end wall 11 formed with a flat, sample-engaging face 12 and a central longitudinal hole 13. The upper end of the casing 10 is closed by a disk or cap 14 removably secured to said casing by a threaded connection 15. Arranged in the casing 10 intermediate of its ends is a reciprocable, cylindrical plunger 18 preferably slidingly engaging the inner wall or bore of said casing. A strong expansion spring or other resilient member 20 is disposed in the casing with its opposite ends bearing respectively against the lower face of said disk 14 and the upper face 19 of said plunger and acting to move said plunger in a direction toward said end wall 11.

A suitable test member, such as a hardened steel ball 21 is mounted in a ball-retaining member or holder 22 in the casing and which preferably extends into the aperture 13 and is adapted to have a limited endwise movement relative to said casing.

The ball holder 22 is preferably formed on or secured to the lower end of an anvil or striking block 24 having a limited lengthwise movement in the casing and which is disposed below and in spaced relation to the plunger 18. By moving the plunger upwardly to compress the spring 20, and then releasing the plunger, the latter will be forced downwardly and will strike the anvil or block 24. The resulting impact will drive the test member 21 into the surface of the sample.

The block 24 is yieldingly supported by suitable means in a manner to hold the test member 21 in predetermined inoperative or initial relation to the casing, preferably with its outer end flush with the sample-engaging face 12. The means shown for this purpose comprises a relatively light coil spring 26 which is disposed in a recess in the bottom wall 11 of the casing, preferably surrounding the holder 22, and bears against the bottom face 27 of the block 24. The spring acts to press an inclined stop face 28 formed in the side wall of said block against a correspondingly tapered end 29 of an adjustable stop screw 30. This screw 30 extends radially through and engages in a threaded hole in the side wall of the casing and is provided with a head for turning it, and also with a lock nut 32 for securing it in adjusted position. By appropriate adjustments of the screw 30, the block 24 can be adjusted longitudinally of the casing 10 to locate the test member 21 in the desired, inoperative or initial position.

In order to compress the spring 20, preferably to the same extent for all tests, and to maintain the spring in this condition until the device is positioned in operative relation to a sample, the plunger 18 is provided with a stem or handle 34 extending upwardly through a hole 35 in the disk or cap 14. This stem is formed with a notch or recess 36 into which a latch or trigger 37 pivoted on the top of the casing 10 is adapted to enter when the notch is moved opposite thereto, in the spring compressing movement of the plunger, see Fig. 2. By swinging the latch 37 to disengage it from the notch 36, the plunger will be released and forced downwardly against the block 24, thus driving the test ball 21 into the material.

The depth of penetration of the test member into the material can be indicated in any suitable manner. For instance, a dial gage 40 having graduations 41 and a hand or pointer 42 is fixed on the side of the casing 10, said hand being rotated in accordance with the movements of a rack and pinion mechanism within the gage. The free end of the rack extends downwardly out of the gage casing and is provided with a stem 43 which extends through a hole in a stud 44 projecting laterally from the anvil or block 24 through a vertical slot 45 in the wall of the casing 10. The stem 43 has an enlargement 46 which is yieldingly held against the under side of the stud 44 by the usual spring in the gage which acts to move the rack upwardly.

In this manner the downward movements imparted to the block 24 by the impact of the plunger 18 are transmitted to the stem 43 for rotating said pointer 42. Preferably, an adjustable friction clip 47 embracing the lower portion of the stem 43 is used for releasably holding the stem against the action of the aforementioned spring, in a position corresponding to the maximum movement of the block 24 and test member 21 for a given test, see Fig. 3. Consequently, the pointer will remain at the reading for such movement until the stem is released by the operator. In this manner the indicating means is not affected by the rebound of the block 24.

Preferably the slot 45 is made of such length that while permitting the inclined face 28 of the block to engage the screw 30, ample clearance is provided for the stud 44 so that the same will not be injured by striking the ends of said slots.

Means are preferably provided for limiting the outward movement of the block 24 and test member 21 under certain conditions, as for example, when the device is not in engagement with a sample or other surface. Under such conditions the block 24 will tend to move to an abnormal extent due to the absence of a resisting body, resulting in an impact of the block against the end wall 11 which might injure or batter the parts, or break the spring 26. For this purpose the block 24 is provided with a second inclined face 50, in opposed relation to the face 28 and engageable with the opposite side of the tapered end 29 of the screw 30. When in inoperative position, the distance of the face 50 from said part 28 of the screw is such that it will strike said part before the block can engage said end wall, but will not prevent the necessary movements of the parts for making tests.

It is also desirable to provide means for arresting the movement of the plunger 18 after its impact with the block 24, and before the face 50 engages the screw 30, to prevent undue battering of the engaging faces of said plunger, block and screw.

For this purpose the lower portion of the plunger 18 is cut away so as to leave a depending portion 52 of reduced diameter connecting with the remaining upper portion to form an annular stop shoulder 53.

A fixed stop, preferably in the form of an annular member 54 is arranged in the casing 10 above and out of contact with the block 24. The bore of this member is of such diameter that the part 52 of the plunger 18 can move freely into the same and the top edge of the member is so positioned that the stop face 53 of the plunger will engage the same and be arrested thereby before the face 50 engages the screw 30. In this manner the engaging faces of the plunger, the face 50 of the block and the screw 30 are protected from injury should the device be operated when not engaging a sample. The position of the stop member 53 is, however, such that ample clearance is provided between the same and the stop face 53 to permit the plunger to effect proper impact with the block 24 under all normal conditions of use.

Preferably, the stop member 54 is detachably secured in the casing 10, as by one or more screws 55 to facilitate the assembly or removal of the parts of the device.

The modified device shown in Fig. 6 is substantially the same as the device of Figs. 1–5, except that the plunger 16ª of the former is held in position for compressing the spring 20ª and released from such position by a trigger 60 mounted on a pivot 61 at the side of the casing 10ª. The pivot 61 is arranged in or adjacent to a pistol grip handle 63, and the trigger is provided with a hook portion 64 formed to snap into a notch 65 in the plunger under the action of a spring 66 when the plunger is moved upwardly.

The hardness testing devices described are formed of few, relatively simple, inexpensive parts, so constructed as to be readily assembled or taken apart. For example, by first removing the top cap, the driving spring and plunger can be removed, and then by loosening the screws 55, adjusting the screw 30 and stud 44, the stop member 54, block 24 and spring 26 can be taken out of the casing.

I claim as my invention:

1. In a hardness testing device, the combination of a casing, a striking block slidable therein and having a test member arranged to be engaged with a sample, a plunger in said casing, a resilient driving element adapted to be compressed and releasably held by said plunger upon movement of the latter in one direction and which expands upon the release of said plunger to drive the same in an opposite direction against said block so as to force said test member into said sample, an adjustable stop on said casing, and resilient means for yieldingly holding said block against said stop with said test member in predetermined relation to said casing and to said sample.

2. In a hardness testing device, the combination of a casing, a striking block slidable therein and having a test member arranged to be engaged with a sample, a stop in said casing, a resilient member engaging said block to move the same in a direction away from the sample and hold said block yieldingly against said stop, a plunger in said casing movable in a direction to strike said block and move the same away from said stop against the action of said resilient member and to drive said test member into the sample, and a part on said striking block adapted to engage said stop to limit the movement of the block and its test member in the latter direction.

3. In a hardness testing device, the combination of a casing, a striking block slidable therein and having a test member arranged to be engaged with a sample, a plunger in said casing, a resilient driving element adapted to be compressed and releasably held by said plunger upon movement of the latter in one direction and which expands upon the release of said plunger to drive the same in an opposite direction against said block so as to force said test member into said sample, a stop on said casing, spaced parts on said block at opposite sides of said stop, means engageable with said block for moving the same in a direction away from said sample and yieldingly holding one of said parts against said stop, and said other part being adapted to engage said stop to limit the movement of the block and test member in an opposite direction under the impact of said plunger.

4. In a hardness testing device, the combination of a casing, a striking block slidable therein and having a test member arranged to be engaged with a sample, a plunger in said casing, a resilient driving element adapted to be compressed and releasably held by said plunger upon movement of the latter in one direction and which expands upon the release of said plunger to drive the same in an opposite direction against said block so as to force said test member into said sample, a stop on said casing, a stop face on said block, means for moving said block in a direction away from said sample and yieldingly holding said face against one side of said stop, and a second stop face on said block which is adapted to engage the opposite side of said stop to limit the movement of said block and test member in an opposite direction under the impact of said plunger.

5. In a hardness testing device, the combination of a casing, a striking block slidable therein and having a test member arranged to be engaged with a sample, a plunger in said casing, a resilient driving element adapted to be compressed and releasably held by said plunger upon movement of the latter in one direction and which expands upon the release of said plunger to drive the same in an opposite direction against said block so as to force said test member into said sample, a stop on said casing having a tapered part, an inclined face on said block, means for yieldingly holding said face against one side of said tapered stop part to maintain said test member in a predetermined initial position, and a second inclined face on said block adapted to engage the opposite side of said tapered stop part to limit the movement of said block and test member under the impact of said plunger.

6. In a hardness testing device, the combination of a casing, a striking block slidable therein and having a test member arranged to be engaged with a sample, a plunger in said casing, a resilient driving element adapted to be compressed and releasably held by said plunger upon movement of the latter in one direction and which expands upon the release of said plunger to drive the same in an opposite direction against said block so as to force said test member into said sample, a stop member on said casing having a conical stop part, an inclined face on said block which is complementary to said conical stop part, resilient means for yieldingly engaging said block to hold said inclined face against said stop part, said stop member being adjustable to engage different portions of said inclined face to adjust said test member to a predetermined initial position.

7. In a hardness testing device, the combination of a casing, a striking block slidable therein and having a test member arranged to be engaged with a sample, a plunger in said casing, a resilient driving element adapted to be compressed and releasably held by said plunger upon movement of the latter in one direction and which expands upon the release of said plunger to drive the same in an opposite direction against said block so as to force said test member into said sample, an indicating gage on said casing, and a part projecting from said block and engaging a movable part on said gage to actuate the latter, whereby the depth of penetration of said test member into the sample is indicated by the movement of said block towards said sample.

8. In a hardness testing device, the combination of a casing, a striking block slidable therein and having a test member arranged to be engaged with a sample, a plunger in said casing, a resilient driving element adapted to be compressed and releasably held by said plunger upon movement of the latter in one direction and which expands upon the release of said plunger to drive the same in an opposite direction against said block so as to force said test member into said sample, a stop in said casing against which said block abuts for initially locating said test member in predetermined position and which is also adapted to be engaged by a part on said block to limit the movement of said block towards a sample, and a second stop in said casing against which said plunger abuts after striking said block to limit the continued movement of said plunger towards said block when said device is actuated under abnormal conditions.

9. In a hardness testing device, the combination of a casing, a striking block slidable therein and having a test member arranged to be engaged with a sample, a plunger in said casing which is movable towards said block to engage the same to drive said test member into said sample, a stop in said casing against which said block abuts for initially locating said test member in predetermined position and a part on said stop which is engageable by a part on said block to limit the movement of said block towards a sample, and a second stop in said casing against which said plunger abuts after striking said block to limit the continued movement of said plunger towards said block when said device is actuated under abnormal conditions.

DONALD C. DAVIS.